United States Patent [19]
Maass

[11] Patent Number: 4,783,799
[45] Date of Patent: Nov. 8, 1988

[54] ELECTRONIC COMMUNICATIONS AND CONTROL SYSTEM

[76] Inventor: Joachim A. Maass, 121 Hillside St., River Plaza, N.J. 07701

[21] Appl. No.: 73,253

[22] Filed: Jul. 14, 1987

Related U.S. Application Data

[63] Continuation of Ser. No. 651,483, Sep. 17, 1984, abandoned.

[51] Int. Cl.$^4$ .......................... H04B 7/15; H04K 1/00
[52] U.S. Cl. ......................................... 380/43; 455/11; 455/26.1
[58] Field of Search ................. 455/11, 26.1; 343/880; 380/43

[56] References Cited

U.S. PATENT DOCUMENTS

| | | | |
|---|---|---|---|
| 3,132,322 | 5/1964 | Maes | 343/880 |
| 3,288,402 | 11/1966 | Icenbice, Jr. et al. | 455/11 |
| 3,667,044 | 5/1972 | Vaughan et al. | 455/11 |
| 4,028,497 | 6/1977 | Saburi | 455/12 |
| 4,152,647 | 5/1979 | Gladden | 455/11 |

*Primary Examiner*—Salvatore Cangialosi
*Attorney, Agent, or Firm*—Sheldon Kanars; John K. Mullarney

[57] ABSTRACT

A fully distributed, disposable, self-organizing, independently powered communications system is described capable of providing a radio-communications channel in environments that may prove dangerous or inaccessible to humans and may be hostile to communications systems by exposing them to electromagnetic interference, obstacles to line-of-sight operation and threats to survival.

14 Claims, 7 Drawing Sheets

ELECTRONIC COMMUNICATIONS AND CONTROL SYSTEM (The invention described herein may be manufactured, used and licensed by or for the Government for Governmental purposes without the payment of any royalties thereon.)

This application is a continuation of application Ser. No. 651,483, filed Sept. 17, 1984, now abandoned.

FIELD OF THE INVENTION

This invention relates to digital communications systems and, more particularly, to a fully distributed, disposable, self-organizing, self-powered system which can be deployed, activated, operated and maintained in a hostile environment without the need for human assistance.

BACKGROUND OF THE INVENTION

As is well known and understood, a wide variety of problems come into play in operating a radio-communications system in a hostile environment. For example, message traffic flow from user to user and from node to node or from relay station to relay station is usually controlled by centralized units which are of far higher complexity, value, weight and bulk than the relay or user station. In digital communications systems this centralized unit frequently is a computer which operates together with a large collection of peripheral equipment. This means that the whole system is hierarchically organized such that the operational availability of the whole system depends on the availability of the highest member in the hierarchy, the central control unit. Someone who is interested in deactivating the system only has to concentrate his efforts on deactivating the central control unit. His task is simplified by the fact that these units are much easier to detect and easier to destroy than the lower and more expendable members of the hierarchy.

Also contributing to problems in their usage, such communications systems most often operate at UHF frequencies, where tall antenna structures are required for line-of-sight transmissions—especially in wooded areas and in localities where other obstructions such as buildings predominate. High antenna structures increase system vulnerability to detection, electrical interference and physical destruction.

With the technology frequently employed in their construction, and with the manners of their implementation, such communications systems offer further disadvantages in that their component parts have to be repaired, replaced and maintained—because of their expensive costs and non-disposability. This leads to additional problems by requiring a dedicated supply, storage and repair organization whose own limits in availability contribute to limits in system survivability.

In order to make a communications system less detectable one has to obscure its appearance. While nothing can be done to reduce a given physical size, one can try to hide system units, e.g., in natural or man-made cover and one can give its electrical emissions a noise-like appearance, e.g., by spreading its electrical emissions over a large frequency range by so-called spread-spectrum methods. However, physical hiding interferes with line-of-sight operation and spectrum spreading increases the cost, complexity and, hence, the physical bulk of the system units.

In order to make communications and communications systems less vulnerable one usually tries to supply a sufficient number of back-up copies of system units and messages, i.e., one increases redundancy. This again can only be bought at higher costs and complexity or one has to accept a decrease in system performance by only partly utilizing the system, i.e., by slowing down or reducing the message traffic.

Other disadvantages of such prior art communications systems will also be readily recognized: (a) The high cost involved because of limited production runs; (b) The continuing use of increasingly obsolete designs so as not to incur the additional costs of new developments; (c) The high degree of training required in the utilization of the communication equipments; (d) The difficulty in transporting about, because of weight, size and bulk.

SUMMARY OF THE INVENTION

As will become clear hereinafter, the electronic communications and control system of the invention comprises a fully distributed, disposable, self-organizing, self-powered communications system. When deployed, it will perform its functions by simultaneously maximizing the survival of the system under all foreseeable threats during the time interval in which the system is needed. As will be seen, the communications system operation entrails the randomly seeding of an area with system units.

More specifically, as will become clear from the following description, these system units are each small, disposable transceivers, which are self-powered, and which include a defined amount of built-in digital processing capability. Preferably contained on a monolithic semiconductor chip utilizing very low power technology, these transceiver units would be powered by a suitable energy storage device such as a capacitor or a plastic-encased thick film or gel battery which could be made rechargeable by a battery of solar cells.

In a preferred embodiment, the entire transceiver unit is attached to a piece of thin plastic material, which can then be deployed as easily as anti-radar "chaff", e.g., by airplane (drone), rocket, balloon or barreled weapon. The plastic film is to be shaped in such a way that it will become entangled in obstacles such as tree foliage and/or other ground cover. The plastic film is additionally to serve as the base material for an appropriate printed antenna structure—with the carrier frequency being such as to allow line-of-sight operation, even in wooded areas, and preferably outside the established capabilities of a potential jammer, or at least in a range where an attempted jamming would require a large investment in equipment usage and power dedication. A suitable carrier frequency, according to the invention, would be at, or above, 12 GHz, and in the interest of power conservation, a pulsed carrier is to be used, with modulation being combined with suitable spread-spectrum schemes if needed.

In accordance with a preferred form of the invention, system operation is initiated by random distribution of system elements over an area which bridges the distance between two, or more, operating terminal stations. Such terminal stations may be of the type including communications stations, sensor elements, remotely activated or operating electronic systems, or remotely activated or operated automata or robot systems, with the system elements being deployable either before, or after, the terminal stations have been established. As will be seen, such system elements may even "wait" in a dormant state in some potentially hostile territory, until being called into action.

The system is a homologue by virtue of the fact that all system units are of exactly similar construction with similar operational capabilities. There is no hierarchical organization whatsoever.

As will be readily understood by those skilled in the art, the disposable transceiver system elements can be recruited into the communications network by call signals issued by the terminal stations, requesting access to the network. Those system elements nearest to a terminal station would then respond to the call, and relay it to the system elements nearest to them, and so on. When a call finally reaches its destination, all disposable transceiver system elements which have contributed to the linking of the two stations together would then become "members" of a particular data path; all other disposable transceiver system elements which have not yet achieved such a linking would "drop out", and return to the standby wait for reception of the recruiting call mode. In furtherance of the system network, different operating and control modes—as well as terminal stations and system element identifiers—will be seen to be represented by suitable codes established in accordance with an operations protocol.

The way in which system elements contact each other can be thought of as being similar to the way in which data-processing elements in living systems, nerve cells, contact each other through their synapses.

BRIEF DESCRIPTION OF THE DRAWINGS

These and other features of the present invention will be more clearly understood from a consideration of the following description, taken in connection with the accompanying drawings in which.

DETAILED DESCRIPTION OF THE DRAWINGS

Figure 1:
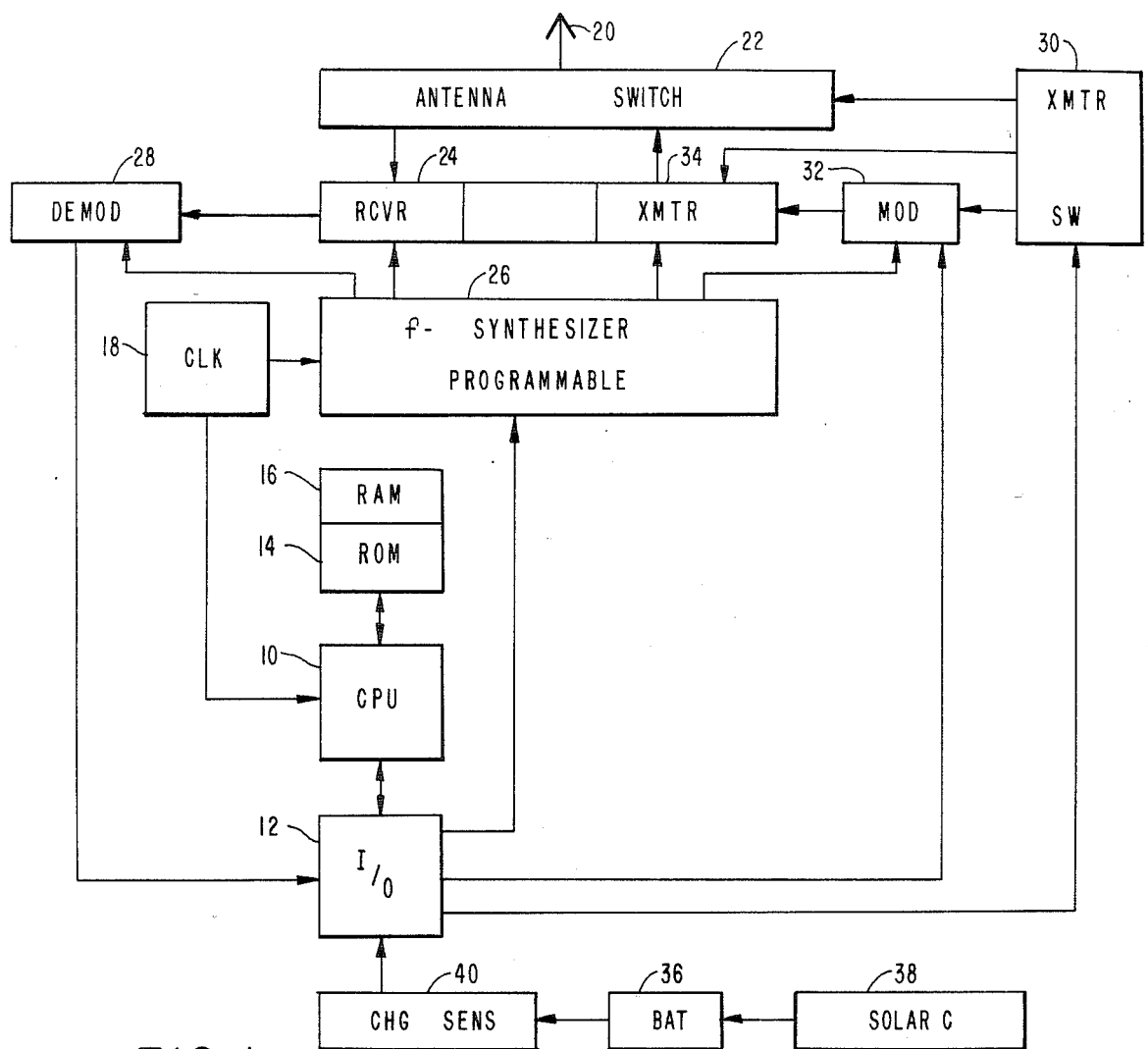
FIG. 1 is a functional block diagram of the electronic communications and control system transceiver element according to the invention.

As the communications and control system of the invention can be viewed as a multiple electronically synapsing homolog, the system description and components will, for the sake of simplicity, be hereinafter referred to by the acronym MESH. Thus, referring to the block diagram of the MESH unit of FIG. 1, reference numeral 10 identifies the central processing unit, which, through its input/output circuit 12 controls all unit functions. The programs for all its modes and, in the case of connected terminals all interfacing characteristics, are shown to be stored in a read-only memory 14. Temporary storage for the processing functions and message buffering is available in a random-access memory 16 and in a stack of registers (not shown). All timing functions—as well as frequency synthesis—are controlled by a master clock 18.

In the receiving mode, the antenna 20, through the antenna switch 22, is connected to the receiver 24, which derives its local oscillator frequency from the frequency synthesizer 26. The received signal is demodulated in the demodulator 28, from where it is routed to the central processing unit 10 through the input/output circuit 12. In the transmitting mode, the transmitter switch 30, under program control from the central processing unit 10 (through the input/output circuit 12), switches on the modulator 32 and the transmitter 34, and connects the antenna 20 to the transmitter output by means of the antenna switch 22. The processed baseband signal from the central processing unit 10 is applied, also, the the modulator 32 by means of the input-output circuit 12, with the modulator 32 then supplying a modulated intermediate frequency to the transmitter 34 whose carrier frequency is supplied, or controlled, by the frequency synthesizer 26. A temperature drift, affecting clock frequency, would thusly have the same direction of deviation in the transmitter 34 as well as in the local oscillator, and, hence, the receiver tuning frequencies of all MESH units deployed in the same environment would have the same directional deviation. It is, of course, possible to improve the basic clock stability by bonding the substrate of the integrated circuit to a material whose thermal expansion counteracts that of the substrate. The remaining temperature instability can then be further compensated by a method of digital compensation as known in the previous art.

Operating power is supplied to the MESH unit by a rechargeable battery 36, which is initially charged and recharged by appropriate solar cells 38, and whose charge condition is monitored by a charge sensor 40. As will be understood, the MESH unit of FIG. 1 drops in and out of operation, depending upon whether the available battery power does, or does not, exceed the threshold of the charge sensor 40. Exceeding such threshold will be seen to result in the activation of the MESH unit, and in the initialization of all its functions. (As will also be understood, the clock 18 activates scheduled frequency and/or code changes for the unit, provided the power be continuously supplied for such purpose. All MESH unit clocks are to be synchronized prior to the deployment in the communications field, in any appropriate manner.)

Figure 2:
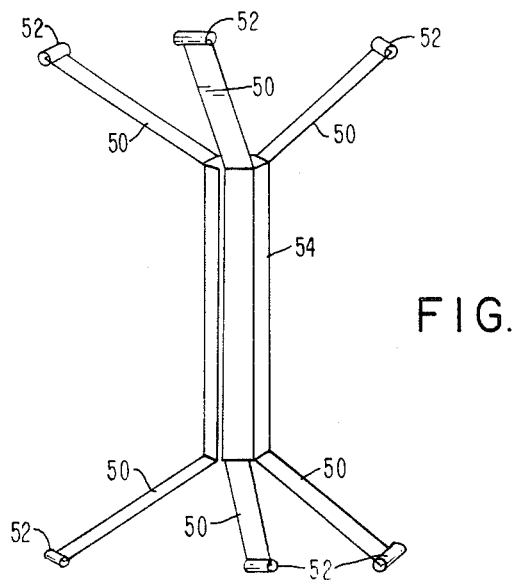
FIG. 2 illustrates a suitable packaging for the transceiver system element as will permit easy deployment by airplane, rocket, balloon, barreled weapon or other suitable deployment conveyance.

A preferred embodiment of the MESH unit is shown in FIG. 2. The unit is shown in deployed form. The body 54 of the unit would be one piece of plastic material which is prestressed in such a way that the depicted shape is automatically assumed as soon as the unit is freed from the deployment package. In the packaged state the unit body 54 would be opened flat and lie in the same plane as the legs 50, tightly packed in a stack with other MESH units. The legs 50 are distributed in such a way that the unit's landing on three legs is always assured. The legs 50 will also serve as substrates for the solar cells and reasonably omnidirectional antenna conductors. A sensing circuit in the transmitter can be made to detect which of the legs are closest to a solid surface, e.g., by a rough measurement of the reflected wave as known from previous art. An internal switching circuit would then make the antenna structures on these legs the ground plane and the antenna conductors on the remaining legs the radiators. The leg tips 52 would be covered by an adhesive which would be activated upon contact with air and kept inactive by a suitable gas in the deployment container. The adhesive would be mixed with, or distributed on top of, a similarly air-activated foaming agent which would keep the device afloat should it land on water. If the foaming reaction is exothermic, the adhesive could as well be of a heat-activated variety. The adhesive will make the first leg that contacts a surface briefly or permanently adhere to the surface whereupon two more legs will contact and adhere to the surface. If the adhesive strength is insufficient, the process will repeat until terminated by curing of the adhesive. Thus, if a MESH unit hits a vertical surface, e.g., of a building, it will actually "walk" down the wall of the building until it has found a stable position where it will stick out from the wall, ready to act as a radio-relay station. In wooded areas some MESH units will adhere to foliage in tree tops, other will fall to the ground or establish themselves somewhere in-between. MESH units that land on other objects, such as vehicles, could be used as moving-target indicators. The inside and/or outside of the body 54 would preferably be used to hold the other components and circuit elements of FIG. 1.

The MESH unit would be a mass-produced device which by virtue of its production in extremely large numbers would always justify its redesign as to reflect the latest state of the art. Presently, it could be expected that the arrangements of FIGS. 1 and 2 would use ribbon-grown or amorphous technology for the solar cells 38. All the elements of the MESH unit are printed or rolled onto, or produced simultaneously with, the carrier as shown in FIG. 2. The rechargeable battery 36 utilizes a weight-and-volume efficient process, preferably employing a Lithium couple. All the remaining linear and digital circuitry is integrated on a single semiconductor chip of extremely-low-power, very-high-speed, and very-high-density technology, probably utilizing complementary-metal-oxide-semiconductor technology on one of the III-V or II-IV semi-conducting compounds, such as Gallium Arsenide. Interconnections will utilize leadless chip-carrier and tape-automated-bonding techniques, omitting all conventional encapsulation. If the unit elements of FIG. 1 are not embedded in the body 54, a thin plastic covering will contain the battery materials and protect the electronics, thereby providing equal life expectancies for all the components of the MESH unit under given environmental conditions. The whole MESH unit will weight at most a few grams and in deployed form only be approximately between 2 and 3 centimeters long.

With the arrangement as thus described, it will be appreciated that the MESH system is based on small, cheap, extremely light weight system elements, which can be deployed extremely simply, and in very large numbers. Because of this, field maintenance is no longer really necessary, except to store the MESH units and to monitor their shelf life by expiration date only. Because the logistics is then similar to that of the storage of soap, ammunition or other disposable items, the communications system of the invention will be set to obviate the need for, and updating of, extensive field documentation, maintenance and test facilities, and the special training of user and maintenance personnel. At the same time, the introduction and updating of technical documentation, testing and personnel training will be seen to be required only at the manufacturing facility. The most expensive operation in conventional electronics manufacturing, that of testing, will be reduced to the testing of random samples during any production run. As such, the user only needs to know the expected value of the yield of operational devices and its distribution in any given manufacture.

Figure 3:
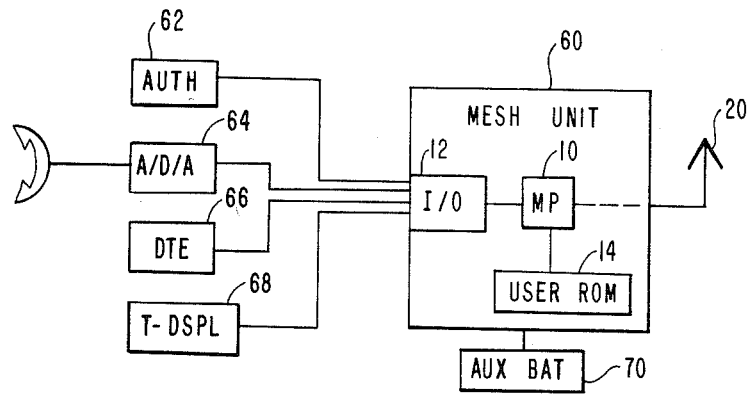
FIG. 3 is a block diagram, in simplified form, of a terminal station as might be employed in the system operation.
Figure 4:
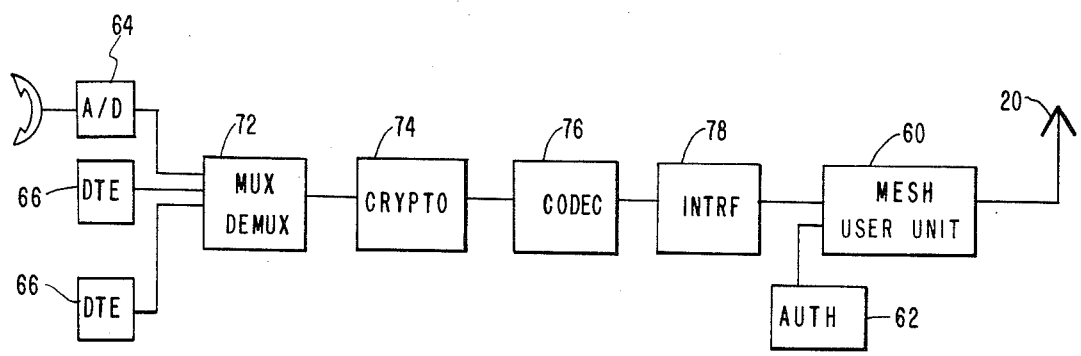
FIG. 4 is a block diagram illustrating the addition of further terminal station equipment for employing the disposable transceiver system elements in a multi-channel operation, for example, and in a communications network to be compatible with other, different communications formats and systems.
Figure 5:
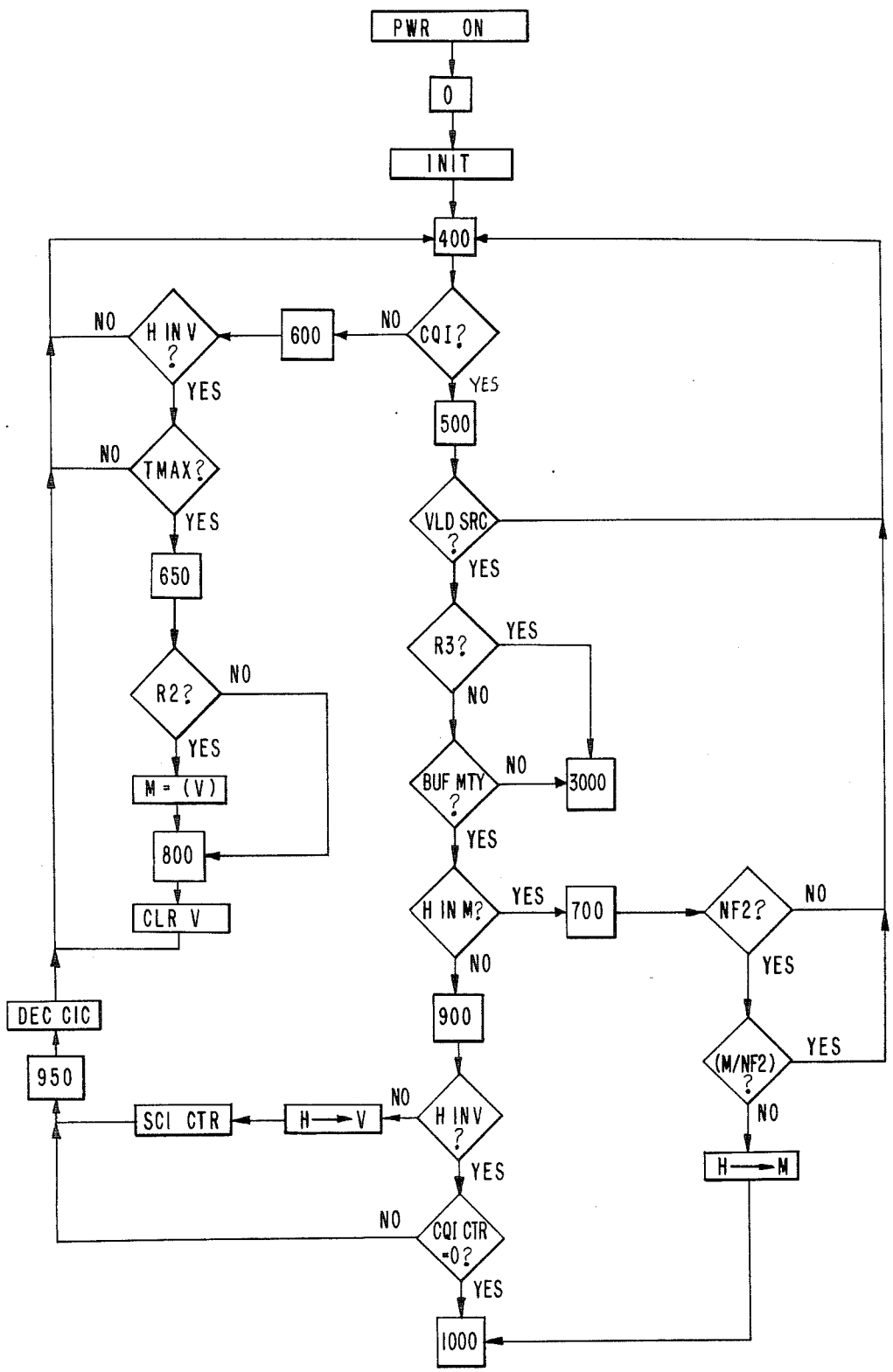
FIGS. 5–10 are flow diagrams useful in an understanding of the present invention.

The MESH user and interfacing units shown in FIGS. 3 and 4 include essentially similar elements as shown in FIG. 1. However, the hardware illustrated in these two drawings differ in the requirement of exhibiting a high reliability characteristic—such that, for example, the chip containing the elements of FIG. 1, in the constructions of FIGS. 3 and 4, would be conventionally encapsulated and fully tested. Additional testing expenses associated with these constructions, however, can still be largely eliminated to the extent that the MESH units employed are available from the random sampling testings carried out in the original MESH production. (Reference numeral 60).

According to user requirements in the communications mode of operation, the input/output circuit of the individual MESH unit 60 might be required to interface with external equipment and/or circuitry—such as analog-to-digital and digital-to-analog converters, crypto devices, sensors and analyzers of biological parameters (for user authentication, for example), special-purpose sensors, processors, actuators, transmitters, interfaces to other systems, etc. As an example (and referring to FIG. 3), the chip can be interfaced with user peripherals such as an authentication unit 62, analog/digital conversion circuitry 64 for voice in/output, data terminal equipment 66 such as a keyboard with or without display or a graphics digitizing pad, and a time display 68. (As indicated, the unit is also powered with its own high reliability battery 70.) If user requirements exceeding the normal MESH capability, but not exceeding the MESH specification, are to be accommodated, additional external equipment can be added, as shown in FIG. 4—such as a multiplexer-demultiplexer 72 for multi-channel operation, crypto equipment 74 to provide for data security, a coder/decoder 76 to improved error rate and, if needed, an interface 78 to make non-MESH hardware compatible with the MESH input/output circuit.

In operation, and referring to the flow diagrams of FIGS. 5–10—, when sufficient battery charge is sensed by the charge sensor 40 of FIG. 1, appropriate power is supplied to the processing circuitry there shown and the functions are initialized, switching "on" the central processing unit 10, its peripherals and the receiver indicated, also actuating the system monitor and clearing the various counters and buffers. The central processing unit then checks the receiver output for incoming CQ-calls (CQI?). If a call is received (500) the central processing unit then checks whether the call came from a valid source (VLD SRC?), i.e., whether the authentication code in the header of the unit is correct. If that is not the case, the central processing unit then returns to label 400, to await an authentic incoming code signal. Upon reception of a valid incoming CQ-call, the central processing unit checks for mode information in the header (H), and in the event of R3-mode branches, couples it to label 3000 (see FIG. 9). The same sequence occurs if the next check (carried out in the unit BUF MTY?) shows that there are untransmitted message units or packets (P) in the R3-mode buffer, indicating that the buffer is not empty.

Figure 6:
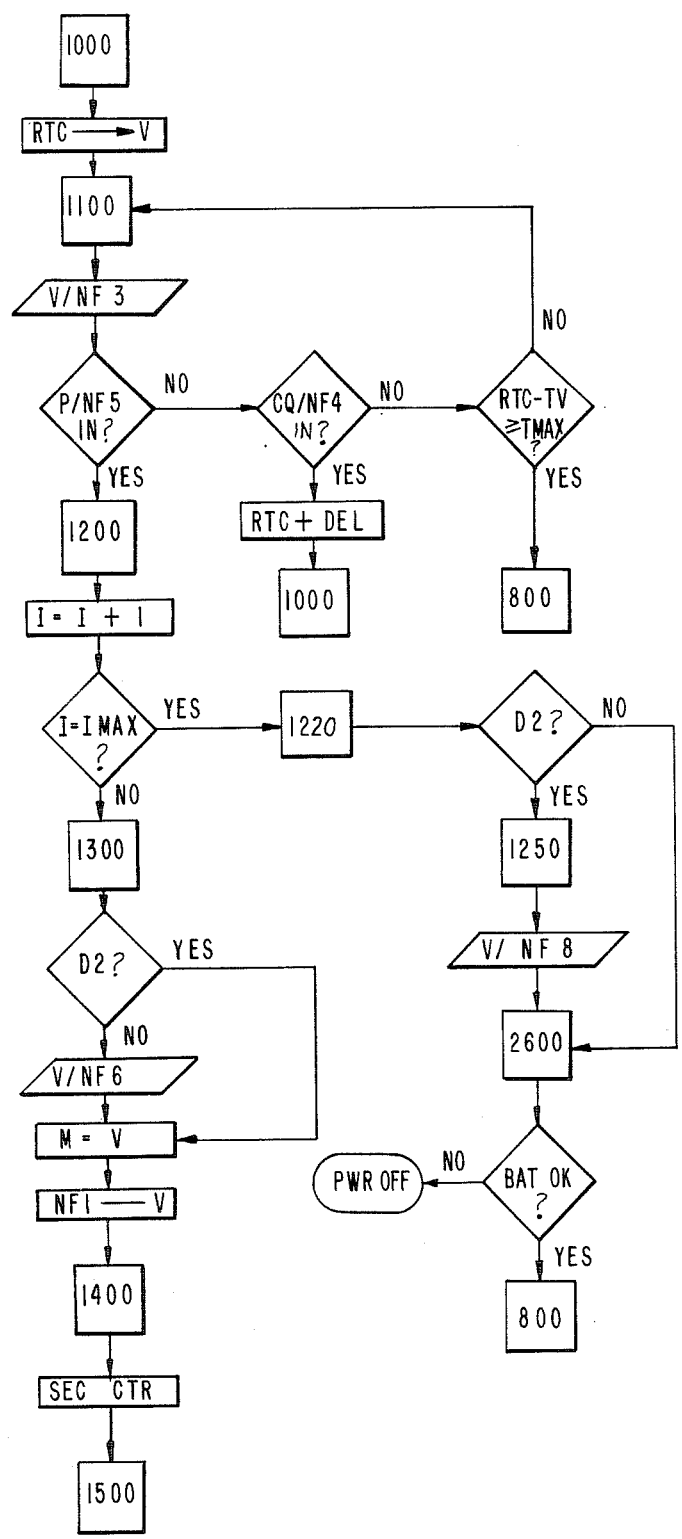
Figure 7:
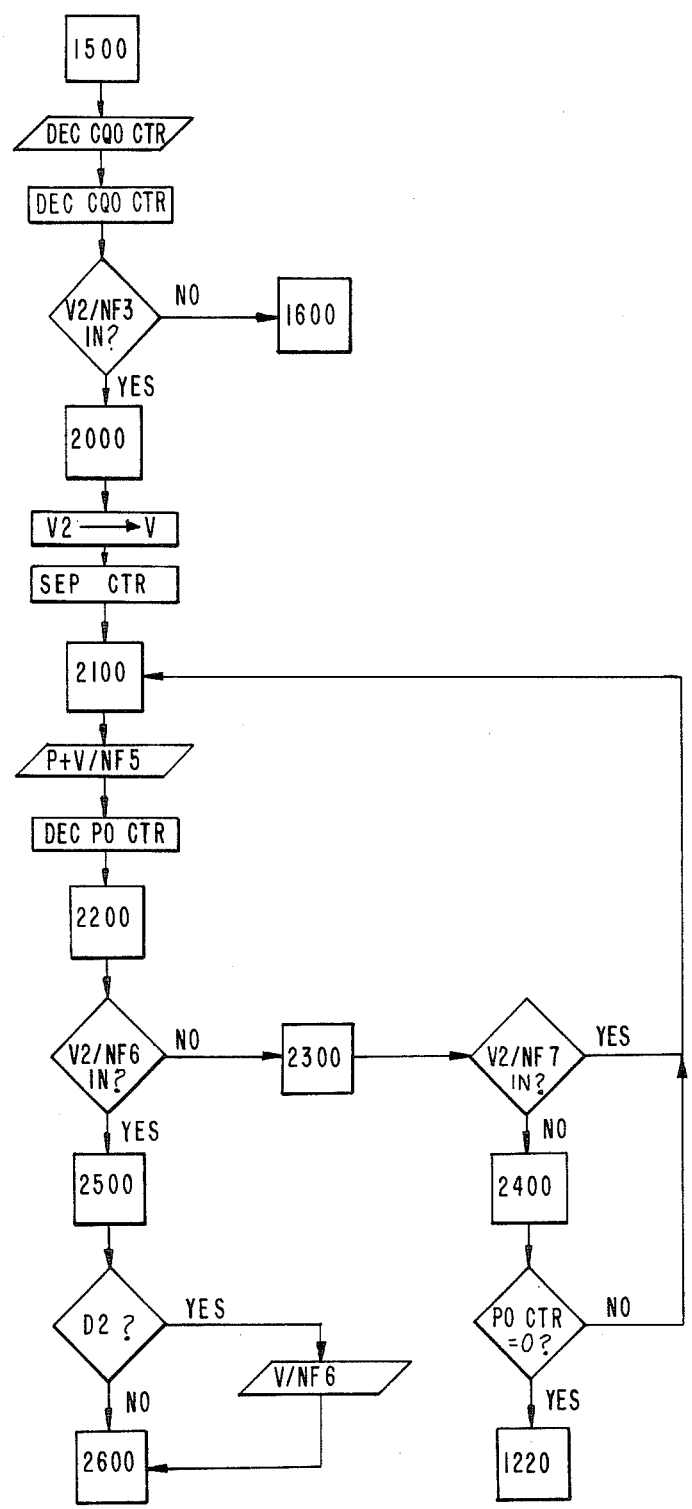

However, if the buffer is indeed empty, the next question in the flow diagram is whether the message units have been handled before and its header (H) is therefor stored in memory (M). If H is found in M (label 700) and the incoming H does not have an acknowledge request code (NF 2) in its network function field, the program then branches back to the label 400 to check again—otherwise, it will check if the old H in M already contained the acknowledge request (NF 2) function. If an H is found in M, and an acknowledge request (NF 2) is located, a branch to label 400 occurs (NF 2 being able to override "H in M" only once). If no NF 2 was in the stored H, the present H containing NF 2 will override the stored H (H→M), and the program then continues at label 1000 (FIG. 6). With a negative "H in M" test (label 900 in FIG. 5), a further test (H in V) reveals whether the message header (H) is held in a temporary register (V). In the negative case, the incoming H is written into V, and a counter is set to a maximum allowed for incoming CQ-calls (SCI CTR). This leads to label 950, which is followed by decrementing the CQ-IN in counter once, and a return to label 400.

If, on the other hand, H was already in the register V, the CQ-IN counter is tested (CQI CTR=0?). If it is 0, a branch to label 1000 occurs, otherwise label 950 is reached. If the CQI-test was negative (label 600), a test would have been made whether the message header (H) was held in the temporary register V (H in V?). If the test turned out negative, branching back to 400 occurs. In the affirmative case, H was received before, and an additional test determines whether too much time (TMAX?) elapsed since the last CQI, then label 650 is reached, but if not, return to label 400 occurs.

At label 650, it still must be tested whether the mode required in the header (H), as held in the register (V), is the wide-path random walk (R2?). In the affirmative case, label 800 is reached after storing the V-content in an appropriate location in memory (M) (M=(V)); in the negative case, label 800 is reached immediately. After that, V is cleared (CLR V), and the program returns to label 400.

In FIG. 6, at 1000, the present reading of the real-time clock (RTC) is written into the appropriate H-field in the V-register. Then the V-content with an acknowledge CQ-NF 3 functional code inserted is transmitted (CQ-acknowledgement). The next decision point is reached (in practice after a suitable time delay), when a test is made whether H, as transmitted between labels 1000 and 1100, together with P and a send-P function NF 5 have been received (P/NF 5 IN?). If this is not the case, the program tests for a request for random time delay (CO/NF 4 IN?). Receipt of such a request causes a random wait beginning at the present RTC-time (RTC+DEL), followed by a return to label 1000. If no NF-4 "delay request" was received, a test is made whether the present RTC-time minus the time at which V/NF 3 was sent exceeds a maximum (RTC-TV≧TMAX?).

If this is affirmative, it is assumed that the service-requesting MESH unit selected another MESH unit to handle its message packet and the program returns to 800; otherwise, the V/NF 3—transmission, etc. is repeated by returning to label 1100.

If the (P/NF 5 IN?) test result was affirmative, i.e., that the message packet (P) is then in this MESH units P-buffer, label 1200 was reached where the hop count (I) in the header (H) is incremented by 1 (I=I+1). If the new I then equals the maximum (I=IMAX?) specified for this MESH-field, further P-travel will be prevented. As will be understood, it is only necessary to test whether D2-service was requested (D2?)—where user units, i.e., data terminals (D) have assigned, e.g., alpha-numerical identifiers which can be changed as required, and which are needed to identify source (D1) and destination (D2) of a message, message unit or packet (P) in the message header (H). The program goes into the battery-check routine (2600) if this was not the case—otherwise into (1250)—, where it will notify the previous MESH unit of a lost packet (P) by transmitting V/NF 8 first, and then run the battery check. According to the program, a battery check is always performed at the end of a program loop, if that program segment contained steps involving high battery drain, i.e., operation of the transmitter.

Without an affirmative TMAX-test result (1300), it is still necessary to test for D2-service. If no (D2) message destination is requested, P-reception can then be acknowledged (V/NF 6), otherwise this is postponed. The next steps store the V-content in M, inserting the NF 1 "sending CQ function" into the register (V)(1400) and setting the transmit-CQ counter (SEC CTR), prior to reaching label 1500.

Figure 8:
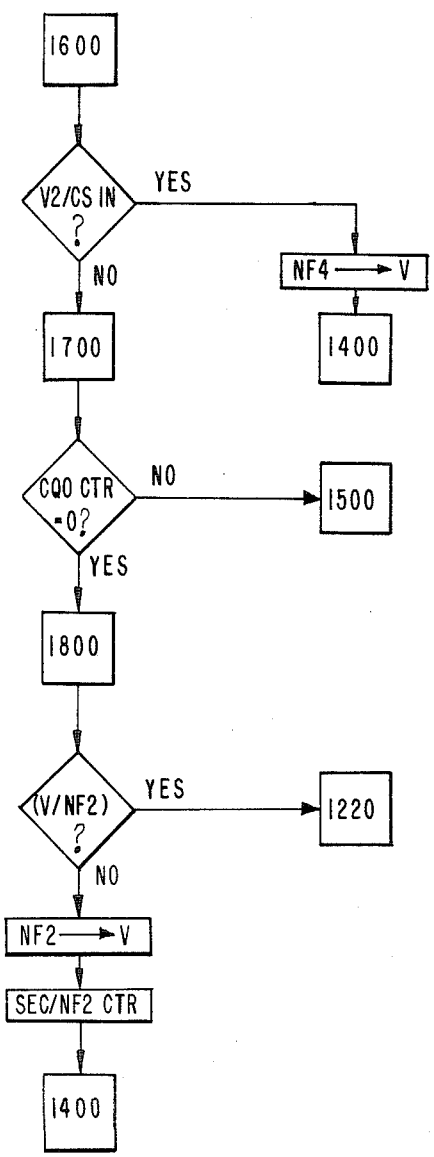

At label 1500 (FIG. 7), the MESH unit begins its attempt to transfer the packet (P) to the next MESH unit (designated U2, with its V-register designated as V2). The first MESH unit (U) transmit a CQ-call (VNF 1) once, decrements the CQ-out counter (DEC CQO CTR), waits for a signal-round-trip time (not shown) and then tests for reception of a CQ-acknowledgement (V2/NF 3 IN?) which would come in after the first CQ-call, provided U2 was identical with D2, the addressee (label 2000, in FIG. 7). Usually, this will not be the case and the program will branch to label 1600 (FIG. 8). If, however, label 2000 was reached, the V2 (the H with U2's RTC-time) is stored in V and the transmit-P counter is set (SEP CTR). At label 2100, P with the V-content and NF 5 "send P" function is transmitted (P+V/NF 5) and the P-out decremented once (DEC PO CTR) to reach label 2200 where a test is made for P-acknowledgement (V2/NF 6 IN?). If this is affirmative (label 2500), D2 must be checked again. If it was requested, P had not been acknowledged between labels 1300 and 1400 and must be acknowledged now (V/NF 6), followed by a return to the battery-check routine 2600.

A negative V2/NF 6-test result (label 2300), on the other hand, requires a test whether repeat of P-transmission was required by U2 (V2/NF 7 IN?), indicative of a repeat of the packet (P) requested. The affirmative case simply results in a return to label 2100, but in the negative case (label 2400), the P-out counter is checked (PO CTR=0?). If it is not zero yet, then return to label 2100 occurs. If the maximally permissible number of P-transmissions has been exhausted, then the program will either return to the battery clock routine 2600 or, in the D2-case, notify the previous MESH unit of a lost packet (P) (label 1220, FIG. 6).

The case of the negative V2/NF 3—test result (label 1600) is shown in FIG. 8. A test is made whether a V2, garbled by another carrier, has been received ((V2)/CS IN?). This would require a delay request (NF 4) in the register (V) and a return to label 1400 (FIG. 6). If nothing has come in (label 1700), the CQO-counter is checked—and if it has not yet run down to zero, return to label 1500 is indicated. If it is zero (label 1800), it is necessary to test for the NF 2 "acknowledge request", i.e., whether an acknowledge-request series has been transmitted previously. If this is the case, the program returns to label 1220; and, if not, then the NF 2 request is inserted into the register (V), the CQ-out counter is set to a number adequate for NF-transmissions, and the program returns to label 1400.

Figure 9:
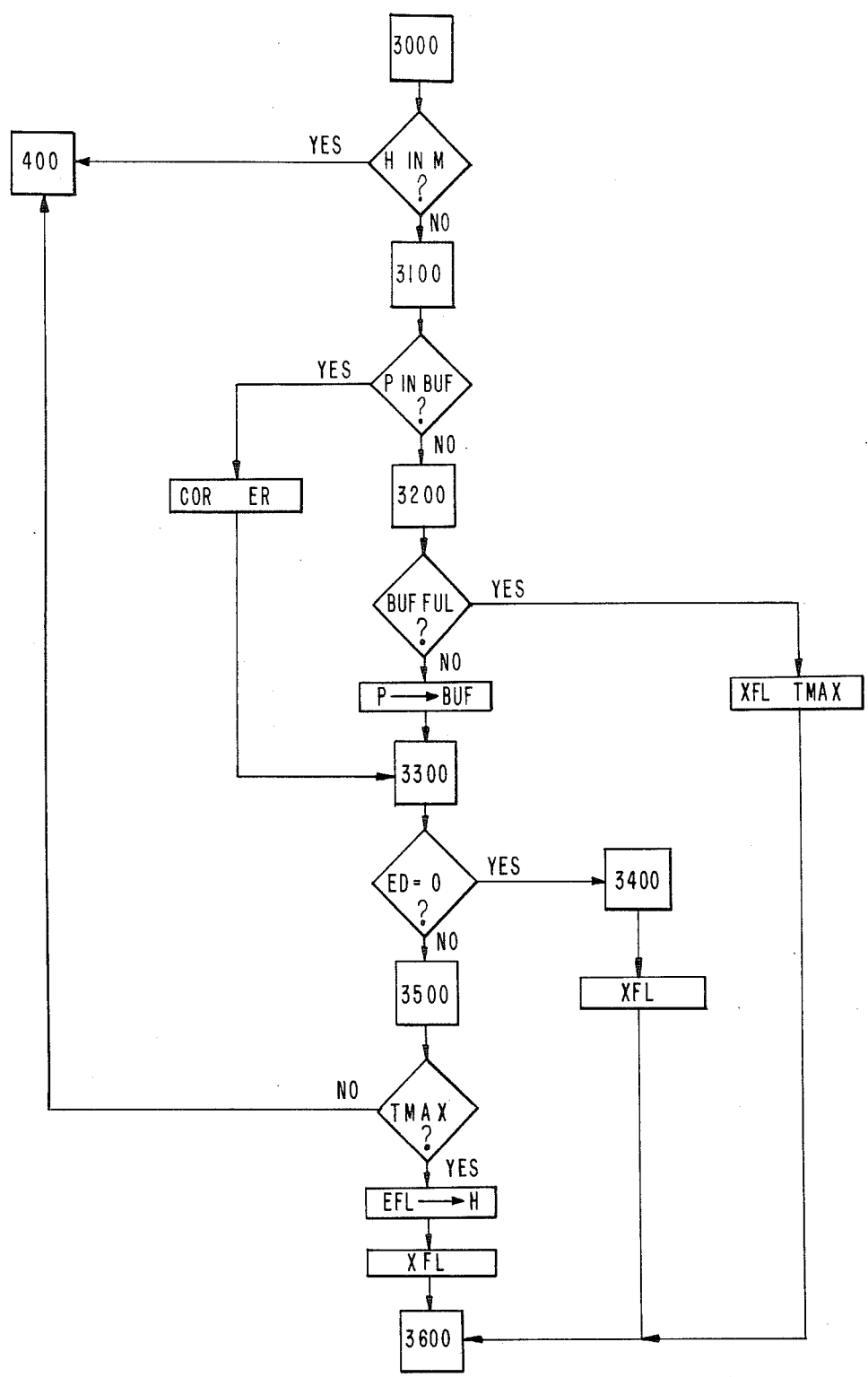

An R3 service request or unfinished R3 business diverts the program to label 3000 (FIG. 5), continuing it from there, as shown in FIG. 9, where first the memory is searched to determine whether it contains H of the incoming call (H IN M?). If this is the case, the program returns to label 400 of FIG. 5. A negative test result (label 3100, however) requires a check whether the packet (P) is held in the P-buffer. If P is found in the buffer, it was not error free and the incoming copy of P is used to correct errors in the previous copy. If the message packet (P) was not yet in the buffer (3200) on the other hand, and there is still space in the buffer, P is read into the buffer (3300). If, however, the buffer were full (BUF FUL?), then the incoming message packet (P) cannot be handled at this time, and the buffer address of the P that has been in the buffer the longest is pointed at by a transmit-flag (XFL) register (XFL TMAX) for immediate transmission, by label 3600.

If label 3300 was reached, and there is a message packet (P) in the buffer for which the error detection is zero (ED=O?), the "XFL" flag is set to point at that packet (P) (3400), followed by the label 3600.

If all P in the buffer contain at least one error (at unit 3500), a test is then made according to the program, whether one of the P has reached the maximally permissible storage time (TMAX ?). In the affirmative case, the header (H) of that packet (P) is then marked with an error flag (EFL→H)) and "XFL" flag set to point to its address, followed by the label 3600. A negative TMAX-test returns the program to the point 400 of FIG. 5.

Figure 10:
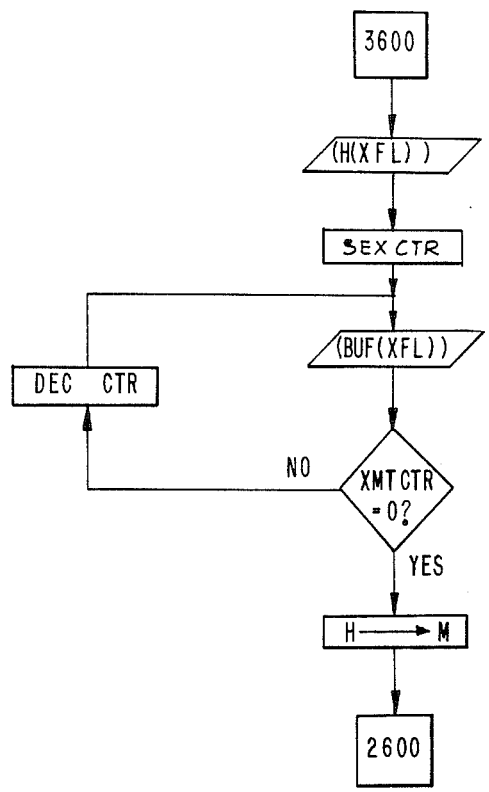

The R3-transmission sequence begins at point 3600 in FIG. 10, with a single transmission of the header (H) as pointed to by the "XFL" flag. After that, the transmit counter (XMT CTR) is set (SEX CTR) and the buffer content indicated by "XFL" is transmitted (BUF (XFL)). Then, the transmit counter is checked—and, if it is zero, H is stored in memory (M) and the program continues to label 2600. If the counter is not yet zero, it is decremented once (DEC CTR) and the transmission repeats itself again.

As will thus be seen, and as will be understood by those skilled in the art, the MESH system elements thus perform the following functions:

a. In the recruiting mode, the elements receive incoming signals and validate them according to their identifying and control code (the latter indicating a recruiting signal). Depending on the quality of the channel (e.g. noise, attenuation, multi-path distortion, etc.) between the signal source and the receiving unit, a certain number of calls would be required before enough error-free signals would match the count in the pre-set counter of the unit. The system element will then issue an acknowledgement to the calling station, thereby silencing it, and will start transmitting call signals of its own.

b. In the communicating mode, on the other hand, the MESH system element will relay only messages from terminal stations which were the originators of the original calling chain. However, it will accept and acknowledge recruiting calls from the other terminal stations involved, provided their call is addressed toone of the terminal stations of the MESH unit in question. The system element will thus store addresses of all terminal stations with which it communicates.

On the other hand, the MESH unit operates upon the receipt of a proper command, and in response, will switch its code generator to any other code and/or change its pre-set counter number as the case may be. In such instance, if the system element in the communicating mode then attempts to relay a message to the next system element in the network, and that unit does not acknowledge the address, the transmitting system element will notify the message originator of a break in the chain, and then switch to its recruiting mode.

Message routing in the MESH system is thus determined by the operating mode of its individual unit. Such mode can be selected from a menu, according to the invention, in firmware by the appropriate code in the header (H). Two basic code schemes according to the invention can be identified as the "random walk" (R1) and the broadest mode (R3)—but can be modified further by a "wide-path" random walk (R2) and a form of end-to-end control for R1 and R2 by an automatic message acknowledgement according to message destination and source identification (D2, D1, respectively), resulting in routing schemes R1, D2 and R2, D2, for example.

The user's data terminal equipment, D, allows for the selection of one operating mode from a series available to that particular user, thereby giving a greater choice of operating modes to a higher-priority user than to a lower-priority user. The terminal equipment (D) will then place an operating code, OPC, into the designated field which identifies the routing scheme corresponding to the operating mode under which the message (P) was issued. Such code can be appended by a sufficient number of bits to identify various network management functions (NF) such as (a) Send CQ; (b) Acknowledge Request; (c) Acknowledge CQ; (d) Delay Request; (e) Send P; (f) Acknowledge P; (g) Request Repeat of P; and (h) Loss-of-P Notification in D2-Mode.

In this manner, the R1 and R2 modes support P-travel within a MESH field from one originating data terminal (D), i.e., D1, to one destination (D2) via a random walk that links D1 to a succession of MESH units terminating in D2. P-transfer is initiated by D1 by means of repetitive CQ-calls, which consist of H with the appropriate operating code (OPC). Any neighboring MESH unit that is not busy with other tasks will then receive the CQ and compare incoming H-fields with its own stored validation and authentication codes. The process then repeats until a MESH unit achieves a predetermined number of matches, which could either be part of the header information or stored in firmware. The number of required matches serves as a threshold for CQ-acknowledgement from the MESH unit. Since that unit which receives the CQ-calls with the least interference, attenuation and delay will acknowledge them first, the message will be made to travel over the best available channel, from the originating unit (D1) to its so-linked neighbor. Acknowledgement then consists simply in a re-transmission of the header by that neighboring unit, along with the network function indicating acknowledgement plus the neighboring unit local time of re-transmission. Reception of an acknowledgement thus causes the originating MESH unit to terminate its CQ-calling sequence, making it impossible for most other neighboring MESH units to reach their thresholds for incoming CQ-calls. If, however, more than one MESH unit has reached the CQ threshold, they will then compete for the same message packet by acknowledging the CQ.

But, in accordance with the present invention, there exists three features in the R1 and R2 modes to help break such a contention case between neighboring MESH units—(1) Carrier Sense Multiple Access (CSMA); (2) Local-Time Tag; and (3) Random Acknowledgement Delay.

CSMA is used in the MESH units of the invention, and operate in such a way that a transmitter at an originating location or at a neighboring location can be switched on only after the receiver of that particular unit was unable to detect any other carrier on the air. Depending upon propagation delays between the originating unit and contending MESH units, CSMA may be sufficient to break acknowledgement contention. However, if neither of the contenders did detect the other's carrier in the time required to block their own transmission, they may acknowledge about the same time. Since each acknowledgement will be supplemented by the local time of the acknowledging MESH unit, and these times are highly unlikely to be the same, the received acknowledgements can be ascribed to particular MESH units by the originating system element, providing the original unit's processing time is less than the difference in arrival times between acknowledgements. In this case, the message would be addressed to that MESH unit whose acknowledgement arrived first, i.e., the message would be transmitted with the header supplemented by the local time of the addressee. Any contending MESH unit would then refuse to handle the message packet by simply ignoring it.

If acknowledgements arrive at the originating unit so close within each other that there is not enough processing time to read and separate the local times, the acknowledgements will then tend to destroy each other. In this case, the originating unit will send a repeat CQ according to the invention, this time with the management function (NF) indicating a random delay request. Contending message units receiving this CQ will then wait a random time interval before attempting acknowledgement. The entire process then repeats until contenders are separated either by CSMA, or by local-time differentiation. After that, the originating unit will send its message packet to the first MESH unit in time, which then can be assigned a designation (U1), the originating unit having the designation (D1).

(In the R2 mode, all MESH units (U's) which received a copy of the CQ but did not become U1 would store H and from then on, refuse handling a P belonging to the header (H).)

After D1 has transmitted its message packet to U1, it has completed its task, and U1 would then attempt to dispose of that message packet by repeating all of the previously described D1-functions, i.e., the message packet (P) would be handed to another MESH unit (U) to become U2. At that time, U1 would have stored H which prevents it from re-accepting that particular packet (P). The packet (P) would then travel from U2 to U3, and so on, along a path which resembles a "random walk". As will be appreciated, the loop cannot come back on itself, because no previous handler of the message packet (P) will handle it again, with one exception—which may arise when P travels towards the edge of the MESH field in such a way that it wiped out all return possibilities behind it: in that case, the CQ-calls of the MESH unit nearest to the field edge will not elicit an acknowledgement, and only then will the MESH unit place an acknowledge request into the NF field and re-issue CQ-calls. Such "acknowledge requests" will override the rehandling refusal in any previous MESH unit, with the packet (P) then travelling from $U_n$ to $U_{n-1}$, whereupon $U_{n-1}$ removes the "acknowledge request" and tries to pass on the packet (P) in the usual way. If this fails, an attempt will be made to reinstate the acknowledge request, etc. According to the construction of the units in the block diagram structure any MESH unit that has handled a packet twice will be prevented from handling it a third time under any circumstances, so that the packet (P) is forced away from the edge of the MESH field.

(Whenever a CQ-call is received by a data terminal for which it is destined (D2), then that terminal will acknowledge the CQ immediately in order to terminate the message packet (P)-travel.)

According to the invention, the message header (H) also has a field for the accumulative hop count. This is a number which is incremented every time the message packet (P) is received by a MESH unit (U). Another field in the header (H) contains a number which determines a maximal hop count. Whenever the accumulative equals the maximal hop count, no further CQ will be issued by the receiving MESH unit, so as to assure that the packet which does not reach the desired destination after a number of trials will be deemed unreasonable for the size of the MESH field, and will be abandoned. If the packet priority warrants it, a D2-operating mode can be included to notify the originating unit of the lost packet, which could then be re-transmitted, and in a R3-mode.

Such R3-mode is a broadcast one in which the message packet exhausts all the resources of the MESH field once. In this mode, it is virtually impossible for an existing intended destination not to be reached by the packet, and is very useful for reaching classes of destinations, i.e., all binary digits within the field so as to subdivide the class. In this mode, the originating unit only issues a single CQ-call to initiate all neighboring, unoccupied MESH units to the R3-mode. This is followed by repeated transmissions of H-P sequences, which are to be accepted by each MESH unit in the R3-mode, putting it into a buffer. Each unit would continue accepting the packet (P) until all errors are corrected, or no further packets (P's) are received. At that time, the MESH unit would store the header to bar rehandling of the packet (P), and proceed as D1, the originating station, did before. In this fashion, the message packet will travel as a single expanding ring around the originating station, and will even travel backwards if a MESH unit has been missed, either due to an obstacle or because of temporary non-availability. Such feature makes it possible, therefore, for two or more, P-rings to penetrate without annihilating each other. Only at the boundaries of the MESH field, would such P-ring be destroyed.

As thus described, certain advantages will be definitely seen to exist utilizing the communications system of the present invention. First, the system will be seen to be a totally probabilistic one in every respect, consisting of a set of system elements of which only a subset, determined by the production yield in that particular set, would be operational at any given time. A still smaller subset, determined by battery-charge conditions and message-traffic loading, would be taking part in system functions. All system elements temporarily or permanently not engaged in system activities, would still act as decoys to foil search and collect operations.

Secondly, direction finding, or tracing, of communication paths will be seen virtually impossible due to the random and continually changing distribution of active system elements. Terminal stations will be seen not to have any specific signature which could allow one of them to be distinguished from the system elements being used.

Also, the line-of-sight operation introduces no detrimental effect since all line-of-sight obstacles simply act as supports for the system elements, thereby proving a disadvantage to a potential jammer. Multipath effects will be seen to result in negligible multipath spread, as well, due to the short average distance between system elements in operation. And, because the transmitter power of active system elements is so low as to be nearly indistinguishable from a widely dispersed low-power-random-noise source, conventional systems that operate in the same geographical area will experience only a slight raise in background noise which is not likely to interfere with their normal function. Conversely, a strong conventional emitter within the MESH field, operating in the same frequency band, would incapacitate only a relatively small number of MESH units. Message traffic would simply route itself around the disturbance.

As will be apparent, the MESH construction is eminently suitable for communications and control in geological and jungle exploration, mining operations, explosives removal, nuclear and toxic removal and cleanup operations, fire-fighting, etc. It is a desirable system for disaster preparedness and for establishing communications during an emergency and after a disaster has occured that wiped out all conventional means of communications. Necessary terminal stations, not larger than a wrist watch, can easily be air-dropped together with the MESH units, e.g., by dangling them from small marker parachutes orlong, brightly colored ribbons on which could be printed the operating instructions. MESH terminals could be dispensed as part of survival packages for sea and air travel and transport crews, forest and park rangers, etc. MESH is also particularly suitable for all purposes where the user must not be encumbered by clumsy equipment or restricted in his movements by line-of-sight requirements. It is an ideal system for the communication with, and control of, autonomous or semiautonomous robots.

Intelligence and reconnaissance operations in hostile territory could similarly benefit according to the system of the invention—as an operator in enemy territory is only called upon to use a transmitter with extremely low output power, just sufficient to enter the nearest neighboring MESH unit. Interception of such MESH communication, however, would give no clue as to the location of the terminal station, as previously indicated. And, to prevent "spoofing"—i.e. an unauthorized entry into the system—, the terminal stations can be linked to vital functions of their carriers in use in the communications network—such as to a biological-electrical signature, in the nature of electrocardiogram, electroencephalogram, or other available identifying indicia, so as to grant access to the system only to authorized users. Cryptosecurity can be introduced rather easily either by storing enough cryptokeys in a read-only memory of each unit, where, e.g., the message number could determine the key selection, or by conventional means external to the MESH system. Code breaking attempts would take longer than the life time of a particular MESH field.

Initial charging of the batteries could be accomplished inductively through the deployment container by replacing the connection to the solar battery with a connection to an inductive antenna loop via a rectifier diode. Upon deployment this connection could be broken, e.g., by an air-triggered exothermic chemical reaction which would also fuse the battery terminals to the solar battery. This same action could be used to initialize the system units and synchronize their clocks.

While there has been described what is considered to be a preferred embodiment of the present invention, it will be readily appreciated by those skilled in the art that modifications may be made without departing from the scope of the teachings herein. For at least such reason, therefore, resort should be had to the claims appended hereto for a correct understanding of the invention.

I claim:

1. A radio communication system comprising:
a multiplicity of randomly scattered self-contained like relay transceiver stations which automatically select particular ones of said relay stations to complete a relay link for communicating radio messages between two user terminal stations so long as the distance between said stations is bridged by said relay stations in line-of-sight proximity with each other; each relay station including an antenna, a receiver, a transmitter, means for switching said antenna between said receiver and transmitter, a programmable frequency synthesizer connected to said receiver and transmitter, a signal demodulator connected to said receiver and synthesizer and supplying a demodulator signal, an input/output means connected to said demodulator and synthesizer, a central processing unit connected to said input/output means, said central processing unit for initiating and discontinuing communication with other stations independent of control from a user station upon receipt of a predetermined signal including programming means for automatically selectively responding to received message recruiting calls and transmitting an acknowledgment signal to the sender and transmitting recruiting calls to another relay station to complete a link for transfer of messages between said user stations independent of and without selection from a user station, memory means connected to said central processing unit for storing all predetermined programming modes of said programming means, clock means connected to said synthesizer for controlling the frequency thereof and to said central processing unit, a modulator connected to said transmitter and to said synthesizer and input/output means, a transmitter switch connected to said antenna switch and to said transmitter and modulator and input/output means, and means supplying power to said input/output means.

2. The combination of claim 1 wherein said programming means includes a program which operates to independently select the one out of several neighboring relay stations or terminal to which the electromagnetic propagation path is least obstructed by noise, attenuation and multipath effects and establishes a threshold of error free incoming signals to activate the receiver and transmit said acknowledgment signal, the selected relay stations completing a link between said first and second user terminal stations, and the unselected stations remaining inactive.

3. The system of claim 2 wherein said relay stations each include rechargeable power means.

4. The combination of claim 3 wherein said relay stations are composed of a foldable structure that forms a carrier upon which all elements of said relay station are deposited.

5. The combination of claim 4 wherein said carrier has extensions at each end that form leg-like support structures in such a way that a number of said structures support said carrier while the remaining number of said structures extend away from the supporting surface.

6. The combination of claim 5 wherein each of said support structures is the substrate for conductors forming antenna elements.

7. The combination of claim 6 wherein each of said support structures is also the substrate for a solar cell or a battery of solar cells.

8. The combination of claim 7 wherein said power means is a rechargeable battery having its components distributed over part of said carrier.

9. The combination of claim 8 wherein all the remaining components of said relay station are combined in integrated circuits and said circuits are attached to, or imbedded in, said carrier.

10. The combination of claim 9 wherein the tips of said support structures are covered by an adhesive.

11. The combination of claim 2 wherein a read-only memory stores said program and all data for the operation of said communications system including the operating protocols.

12. The combination of claim 11 wherein said read-only memory also contains a cryptocoding and decoding program and a protocol for the assignment of cryptokeys.

13. The combination of claim 4 wherein a multiplicity of said relay stations is layed flat on top of each other in stacks that fill said carrier from which said relay stations can be emptied, whereupon they assume a predetermined shape by virtue of prestressed areas in the material of said carrier.

14. The combination of claim 13 wherein said carrier is of a nonmetallic material.

* * * * *